Aug. 20, 1946.  R. L. McCOY  2,406,235
PORCELAIN PIPE
Filed Feb. 25, 1944
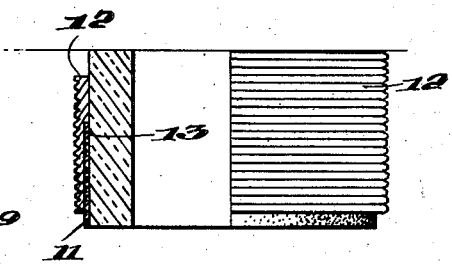
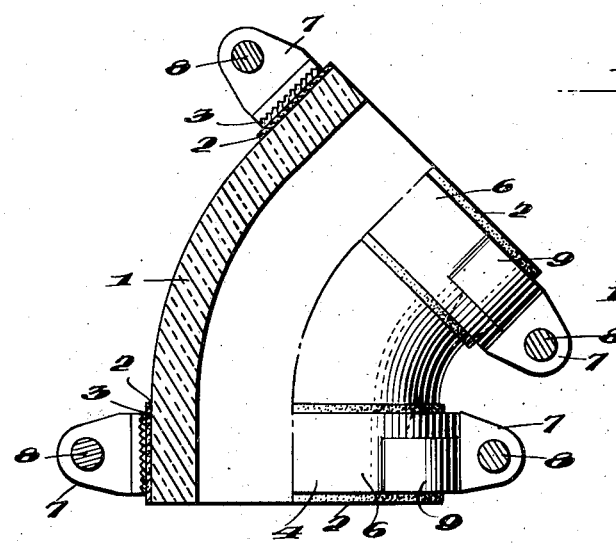
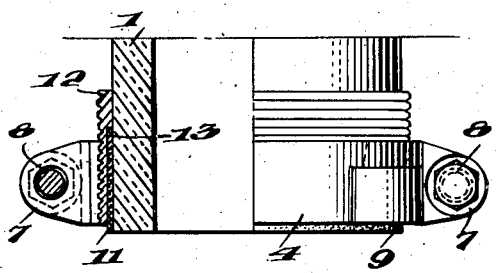
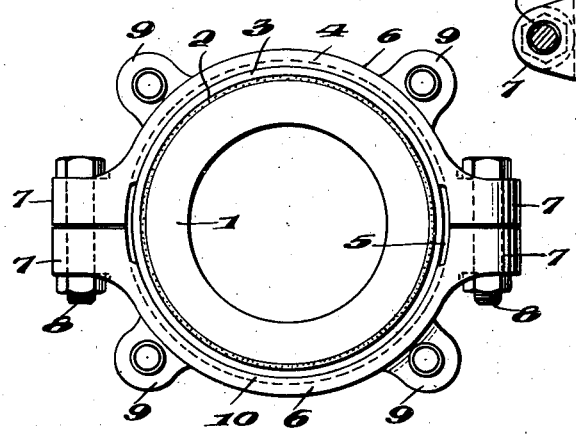
Inventor
Robert L. McCoy
By _____
his Attorney Patented Aug. 20, 1946

2,406,235

UNITED STATES PATENT OFFICE 2,406,235

PORCELAIN PIPE

Robert L. McCoy, Baltimore, Md., assignor to Locke Insulator Corporation, Baltimore, Md., a corporation of Maryland Application February 25, 1944, Serial No. 523,876

4 Claims. (Cl. 138—76)

The invention relates to ceramic or porcelain pipes and more particularly to improvements for coupling such pipes.

In the past it has been customary to cement flanges or other couplings fittings to porcelain pipes and while a permanent connection of this character between the pipe and fitting is usually satisfactory, conditions often occur when adjoining pipes cannot be installed in such manner that the bolt holes in the fitting on one pipe can be brought into alignment with the bolt holes in the corresponding fitting of the other pipe. To meet these special conditions the fittings of certain pipes would have to be cemented to the pipes in a definite predetermined relationship or else, as has been done in the past, some provision must be made enabling adjustment of the pipe fittings when the pipes are being connected.

The arrangements and constructions which have been heretofore employed to meet these conditions have been either quite expensive or impractical and ineffective. The object of the present invention is to provide a porcelain pipe having means whereby a coupling fitting may be rigidly and easily clamped thereto in a plurality of different positions of adjustment.

A primary feature of the invention consists in providing a porcelain pipe with a one-piece sleeve and a multi-part fitting of a coupling device adjustably clamped on the sleeve, the sleeve being of less hardness than the fitting and forming a rigid and immovable part of the pipe.

Another feature of the invention consists in providing the pipe with a sleeve molded on a roughened surface of the pipe, the sleeve affording a base on which a multi-part coupling fitting may be clamped and being of less hardness than the fitting.

Other and more specific features of the invention, residing in advantageous forms, combinations and relations of parts, will hereinafter appear and be pointed out in the claims.

In the drawing,

Figure 1 is a view partly in section and partly in side elevation of a porcelain pipe having a 45° bend embodying my invention.

Figure 2 is an end view of the pipe shown in Figure 1.

Figure 3 is a view partly in section and partly in elevation of a slightly modified form of the invention, the coupling fitting being omitted.

Figure 4 is a view similar to Figure 3 showing the coupling fitting on the pipe.

While a porcelain pipe having a 45° bend has been chosen for purposes of illustration, the invention, of course, is not limited to this particular kind of porcelain pipe but is equally applicable to ceramic or porcelain pipe of any shape. Moreover, while the invention is particularly useful in connection with porcelain pipes, it can be used equally well with any ceramic pipe and the term "porcelain" as used in the specification and claims is, therefore, not to be construed as limiting the invention to pipes made of that material.

Referring more particularly to the drawing, I indicates a porcelain pipe whose outer surface where a coupling fitting is to be applied is roughened by sand or other roughening material. In the embodiment of the invention illustrated, the sand is shown as forming a band 2 encircling the pipe but it will be appreciated that it need not be arranged in this particular manner. The sand or roughening material may be included in the outer surface of the pipe in any well known or desired manner, such, for example, as by spraying it onto the pipe while the glaze is still moist.

Encircling the pipe at each end where a coupling fitting is to be applied is a sleeve or the like 3 which overlaps and interlocks with the roughened outer surface of the pipe. The sleeve is preferably molded onto the pipe by arranging a mold of any suitable kind, not shown, around the pipe and then pouring the material of which the sleeve is composed in a molten or liquid condition into the space between the pipe and mold. Upon solidifying, the mold is removed and the sleeve becomes a rigid and immovable part of the pipe. The sleeve provides a base on to which a multi-part fitting 4 of a coupling device may be clamped and it is preferably of a material which is of less hardness than the coupling fitting. It may advantageously be formed of lead antimony alloy, such as the alloy commonly used consisting of 85% lead and 15% antimony, or it may be made of a material known in the trade as "basolit" or any acid-proof and fire-proof material. In fact so long as the sleeve is of less hardness than the coupling fitting, it may be made of practically any material which will flow into the space between the pipe and mold and which upon solidifying will afford a base to which the coupling fitting may be clamped.

The sleeve extends longitudinally of the pipe a sufficient distance to enable the coupling fitting to be adjusted longitudinally of the pipe to whatever extent may be required. Moreover, its outer surface may be formed with circularly extending ribs or serrations 5 of any advantageous shape or form so as to interlock with corresponding portions on the inner face of the coupling fitting and thus restrain the coupling fitting from shifting longitudinally of the pipe after being adjusted thereon.

The coupling fitting is of any desired construction which may be securely clamped on the sleeve so that, after adjustment, the fitting will remain in place. The particular fitting illustrated in the drawings is formed of two substantially identical parts 6 each having laterally projecting lugs 7 for receiving means, such as bolts 8, for clamping the fitting to the pipe in a desired position of adjustment. Each part of the fitting is also provided with laterally projecting apertured lugs 9 which, upon adjustment of the fitting, will be in alignment with similar apertured lugs of the coupling fitting of the other pipe of the two pipes which are to be coupled. Bolts, not shown, may then be inserted in the corresponding apertured lugs of the fittings to be connected and the pipes thereby securely coupled.

The inner faces of both parts of the coupling fitting are formed with circularly extending ribs 10 and they preferably terminate short of the ends of the fitting. These ribs are advantageously of substantially the same character as those on the outer face of the sleeve 3 so that the fitting may be securely interlocked with the sleeve.

In the form of the invention illustrated in Figure 3, the roughened or sanded outer surface of the pipe is indicated by the reference numeral 11 and the molded sleeve 12 shown thereon, instead of extending substantially the same distance longitudinally of the pipe as the roughened outer surface thereof shown in Figures 1 and 2, extends a substantial distance beyond the inner edge of the roughened or sanded surface. In this way, a ledge or shoulder 13 is formed in the sleeve abutting the inner edge of the roughened surface which will serve to additionally resist forces tending to pull the sleeve off the outer end of the pipe. The multi-part coupling fitting shown on the pipe in Figure 4 is identical in construction with the fitting illustrated in Figures 1 and 2 and it is, therefore, identified by the same reference numerals as that fitting.

With the mold sleeve extending for a greater distance longitudinally of the pipe than the coupling fitting, as shown in Figure 4, the fitting may not only be adjusted circumferentially or rotationally but it may be also adjusted longitudinally of the pipe for a greater distance than would otherwise be the case.

Various modifications and changes may be made in details of the particular embodiment of the invention illustrated and described herein without departing from the spirit and scope of the invention as defined in the appended claims.

What I claim is:

1. In a porcelain pipe having a glazed surface intermediate its ends, an outer roughened surface formed by projecting particles adjacent one extremity of said pipe, a yieldable metallic sleeve surrounding said roughened surface and having said projecting particles embedded therein, exterior serrations formed on said sleeve, and a fitting encircling said sleeve and having interior serrations interlockingly engaging said sleeve serrations; said fitting being adjustable longitudinally of said pipe.

2. In a porcelain pipe having a glazed surface, an outer sanded surface formed integrally with said pipe adjacent an end thereof, a yieldable metallic sleeve surrounding said sanded surface and having the later embedded therein to present a firm interlock therebetween, outer serrations on said sleeve, and a fitting encircling said sleeve and being adjustable longitudinally of said pipe; said fitting being removably secured to said sleeve.

3. In a porcelain pipe having a glazed surface, an outer roughened surface adjacent an end of said pipe and formed by projecting particles embedded in said pipe, a yieldable metallic sleeve surrounding said roughened surface and having said projecting particles embedded therein, said yieldable means extending longitudinally of said pipe beyond said roughened surface so as to present an interlocking shoulder abutting said roughened surface, said sleeve forming an integral part of said pipe, outer serrations on said sleeve, and a fiting removably secured to and surrounding said sleeve and having inner serrations interlockingly engaging said sleeve serrations; said fitting being adjustable on said sleeve longitudinally of said pipe.

4. In a porcelain pipe having a glazed surface, an outer roughened surface adjacent an end of said pipe and formed by projecting particles embedded in said pipe, a sleeve of yieldable material surrounding said roughened surface and having said projecting particles embedded therein, said sleeve extending longitudinally of said pipe beyond said roughened surface so as to present an interlocking shoulder abutting said roughened surface, outer serrations on said sleeve, and a fitting removably secured to and surrounding said sleeve and having inner serrations interlockingly engaging said sleeve serrations; said fitting being adjustable on said sleeve longitudinally and axially of said pipe.

ROBERT L. McCOY.